United States Patent
Lu et al.

(10) Patent No.: US 11,371,907 B2
(45) Date of Patent: Jun. 28, 2022

(54) METHOD AND DEVICE FOR CITY-SCALE NONLINEAR TIME-HISTORY ANALYSIS

(71) Applicant: Tsinghua University, Beijing (CN)

(72) Inventors: Xinzheng Lu, Beijing (CN); Zhen Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 135 days.

(21) Appl. No.: 16/940,141

(22) Filed: Jul. 27, 2020

(65) Prior Publication Data

US 2020/0355574 A1 Nov. 12, 2020

Related U.S. Application Data

(63) Continuation of application No. PCT/CN2018/117680, filed on Nov. 27, 2018.

(30) Foreign Application Priority Data

Feb. 5, 2018 (CN) .......................... 201810112837.3
Feb. 5, 2018 (CN) .......................... 201820207959.6

(51) Int. Cl.
*G01M 5/00* (2006.01)
*G06F 30/13* (2020.01)
*G06F 111/10* (2020.01)

(52) U.S. Cl.
CPC ........... *G01M 5/0033* (2013.01); *G06F 30/13* (2020.01); *G06F 2111/10* (2020.01)

(58) Field of Classification Search
CPC .... G01M 5/0033; G06F 30/13; G06F 2111/10
See application file for complete search history.

(56) References Cited

U.S. PATENT DOCUMENTS

2005/0049962 A1 * 3/2005 Porter .................. G06Q 40/025
705/38

FOREIGN PATENT DOCUMENTS

| CN | 204010481 | | 12/2014 |
| CN | 107590853 | A * | 1/2018 |
| CN | 108647366 | | 10/2018 |
| JP | 2009092402 | A * | 4/2009 |

OTHER PUBLICATIONS

WIPO, ISR for PCT/CN2018/117680, Feb. 27, 2019.

* cited by examiner

*Primary Examiner* — Natalie Huls
*Assistant Examiner* — Cynthia L Davis
(74) *Attorney, Agent, or Firm* — Hodgson Russ LLP

(57) ABSTRACT

A method and device for city-scale nonlinear time-history analysis. The method comprises: acquiring building data; obtaining a model type corresponding to the building data according to the building data; establishing a multiple mass shear series model or a multiple mass shear-flexural parallel model corresponding to the building data according to the model type corresponding to the building data; performing nonlinear history analysis according to time history data of ground motion acceleration from each building through the multiple mass shear series model or the multiple mass shear-flexural parallel model, to obtain a nonlinear history analysis result; obtaining a seismic damage state and an analysis result of each story of each building according to the nonlinear history analysis result.

5 Claims, 8 Drawing Sheets

METHOD AND DEVICE FOR CITY-SCALE NONLINEAR TIME-HISTORY ANALYSIS

CROSS-REFERENCE TO RELATED APPLICATION

This application is a continuation of International Application No. PCT/CN2018/117680, filed Nov. 27, 2018, which claims priority to Chinese Patent Application Nos. 201810112837.3 and 201820207959.6, each filed on Feb. 5, 2018. The entire disclosures of the aforementioned applications are incorporated herein by reference.

FIELD

The present disclosure relates to a technology field of civil engineering, and more particularly to a method and a device for city-scale nonlinear time-history analysis.

BACKGROUND

Earthquakes frequently occur in our country, and a large number of densely populated cities are in high-intensity region. Once an earthquake occurs, serious casualties and economic losses may be resulted. In order to reduce the urban economic loss and casualties caused by the earthquake, it is particularly important to reasonably predict the seismic response of urban buildings.

Currently, the methods for analyzing seismic damage of urban buildings mainly include the damage probability matrix method and the capacity spectrum method. The damage probability matrix method is only suitable for areas with abundant seismic damage data which is hard to generalize. The capacity spectrum method cannot easily represent the influence of the time-domain properties of ground motions to the structures. Therefore, both of the two methods are difficult to meet requirements of seismic damage analysis in urban buildings in in our country.

SUMMARY

Embodiments of the present disclosure seek to solve at least one of the problems existing in the related art to at least some extent.

Accordingly, an objective of the present disclosure is to provide a method for city-scale nonlinear time-history analysis. The method may accurately reflect seismic response of buildings of different heights, simply and efficiently.

Another objective of the present disclosure is to provide a device for city-scale nonlinear time-history analysis.

To achieve the above objectives, an aspect of embodiments of the present disclosure provides a method for city-scale nonlinear time-history analysis, including: acquiring building data; obtaining a model type corresponding to the building data according to the building data; establishing a multiple mass shear series model or multiple mass shear-flexural parallel model corresponding to the building data according to the model type corresponding to the building data; performing nonlinear history analysis according to time history data of ground motion acceleration from each building through the multiple mass shear series model or the multiple mass shear-flexural parallel model, to obtain a nonlinear history analysis result; and obtaining a seismic damage state and an analysis result of each story of each building according to the nonlinear history analysis result.

With the method for city-scale nonlinear time-history analysis according to embodiments of the present disclosure, the multiple mass shear series model or the multiple mass shear-flexural parallel model is established based on the building data, the nonlinear history analysis is performed according to the time history data of ground motion acceleration, and the seismic damage state of each story of each building is obtained according to the analysis result, thus seismic hazard characteristics of buildings with different heights may be accurately reflected and closer to effect of actual seismic hazard, the analysis efficiency is high, and the modeling method is simple. The method may be used for accurate and real-time seismic hazard prediction and seismic hazard analysis under typical urban earthquake scenarios.

In addition, the method for city-scale nonlinear time-history analysis according to embodiments of the present disclosure may also have following additional technical features.

In an embodiment of the present disclosure, the building data includes one or more of a structural type, building height, a number of building stories, a construction year, a story area, and a building function.

Further, in an embodiment of the present disclosure, establishing the multiple mass shear series model or the multiple mass shear-flexural parallel model corresponding to the building data according to the model corresponding to the building data includes: according to the building function, the building height and the structural type, establishing the multiple mass shear series model for an unreinforced masonry structure, a reinforced masonry structure, a frame structure, and a structure with stories less than a given value, and establishing the multiple mass shear-flexural parallel model for a shear wall structure, a frame-shear wall structure, and a structure with stories equal to or more than the given value.

Further, in an embodiment of the present disclosure, the multiple mass shear series model is determined according to the structural type, the building height, the number of building stories, the construction year, the story area, and the building function, where a backbone curve of the multiple mass shear series model is a trilinear backbone curve, an inter-story hysteretic behavior is determined based on a single-parameter hysteretic model; the multiple mass shear-flexural parallel model is determined according to the structural type, the building height, the number of building stories, the construction year, the story area, and the building function, where the multiple mass shear-flexural parallel model consists of flexural springs, shear springs and rigid links to consider both the bending deformation and shear deformation of tall buildings.

Further, in an embodiment of the present disclosure, performing the nonlinear history analysis according to time history data of ground motion acceleration from each building through the multiple mass shear series model or the multiple mass shear-flexural parallel model includes: obtaining the time history data of ground motion acceleration from each building; and performing structure nonlinear history analysis according to the time history acceleration data through a motion equation in structural dynamics.

Further, in an embodiment of the present disclosure, the seismic damage state and the analysis result of each story of each building includes a seismic damage state of each story of each building, a displacement history result of each story of each building, a velocity history result of each story of each building, an acceleration history result of each story of each building, a figure and animation of seismic response and damage states of the urban buildings.

To achieve the above objectives, another aspect of embodiments of the present disclosure provides a device for city-scale nonlinear time-history analysis, including: an acquiring module, configured to acquire building data; an obtaining module, connected to the acquiring module, and configured to obtain a model type corresponding to the building data according to the building data; an establishing module, connected to the obtaining module, and configured to establish a multiple mass shear series model or a multiple mass shear-flexural parallel model corresponding to the building data according to the model type corresponding to the building data; a calculation module, connected to the establishing module, and configured to perform nonlinear history analysis according to time history data of ground motion acceleration from each building through the multiple mass shear series model or the multiple mass shear-flexural parallel model, to obtain a nonlinear history analysis result; and an analyzing module, connected to the calculation module, configured to obtain a seismic damage state and an analysis result of each story of each building according to the nonlinear history analysis result.

With the device for city-scale nonlinear time-history analysis according to embodiments of the present disclosure, the multiple mass shear series model or the multiple mass shear-flexural parallel model is established based on the building data, the nonlinear history analysis is performed according to the time history data of ground motion acceleration, and the seismic damage state of each story of each building is analyzed according to the analysis result, thus seismic hazard characteristics of buildings with different heights may be accurately reflected and closer to those of the actual seismic hazard, analysis efficiency is high, and modeling method is simple. The method may be used for accurate and timely seismic hazard prediction and seismic hazard analysis under typical urban earthquake scenarios.

In addition, the device for city-scale nonlinear time-history analysis according to embodiments of the present disclosure may also have following additional technical features.

In an embodiment of the present disclosure, the establishing module is configured to, according to the building function, the building height and the structural type, establish the multiple mass shear series model for an unreinforced masonry structure, a reinforced masonry structure, a frame structure, and a structure with stories less than a given value, and establish the multiple mass shear-flexural parallel model for a shear wall structure, a frame-shear wall structure, and a structure with stories equal to or more than the given value.

Further, in an embodiment of the present disclosure, the calculation module is configured to: obtain the time history data of ground motion acceleration from each building; and perform structure nonlinear history analysis according to the acceleration time history data through a motion equation in structural dynamics.

Further, in an embodiment of the present disclosure, the seismic damage state and the analysis result of each story of each building includes a seismic damage state of each story of each building, a displacement history result of each story of each building, a velocity history result of each story of each building, an acceleration history result of each story of each building, a figure and animation of seismic response and damage states of the urban buildings.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

Figure 1:
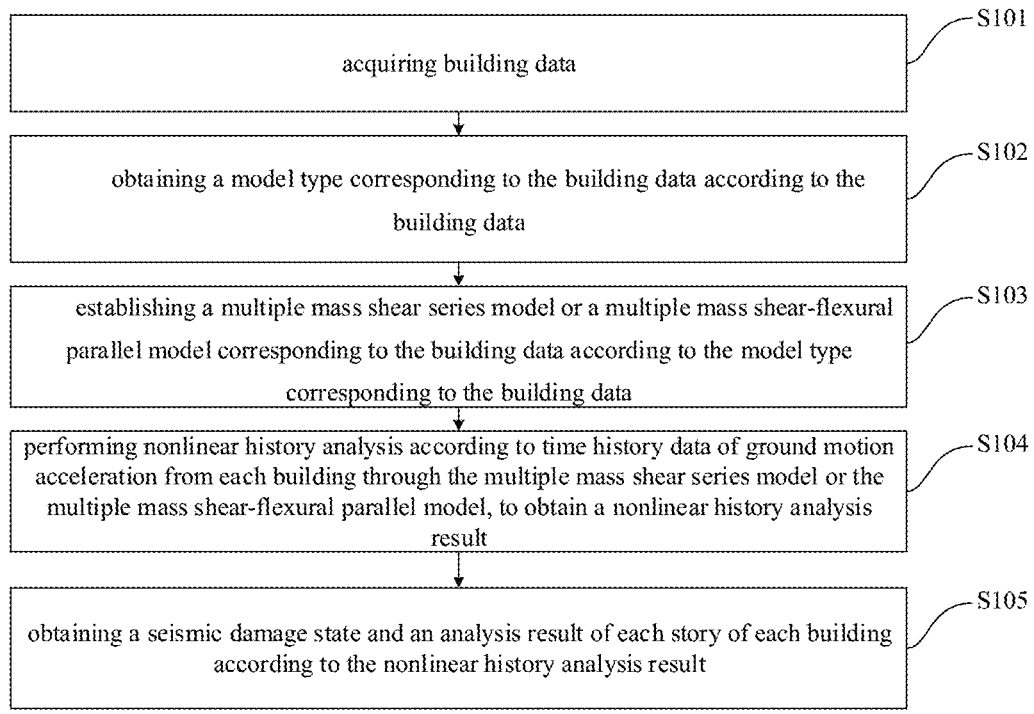
FIG. 1 is a flow chart of a method for city-scale nonlinear time-history analysis according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Description of a method and a device for city-scale nonlinear time-history analysis provided according to embodiments of the present disclosure will be made with reference to accompanying drawings. Firstly, description of the method for city-scale nonlinear time-history analysis provided according to embodiments of the present disclosure will be made with reference to accompanying drawings.

Figure 2:
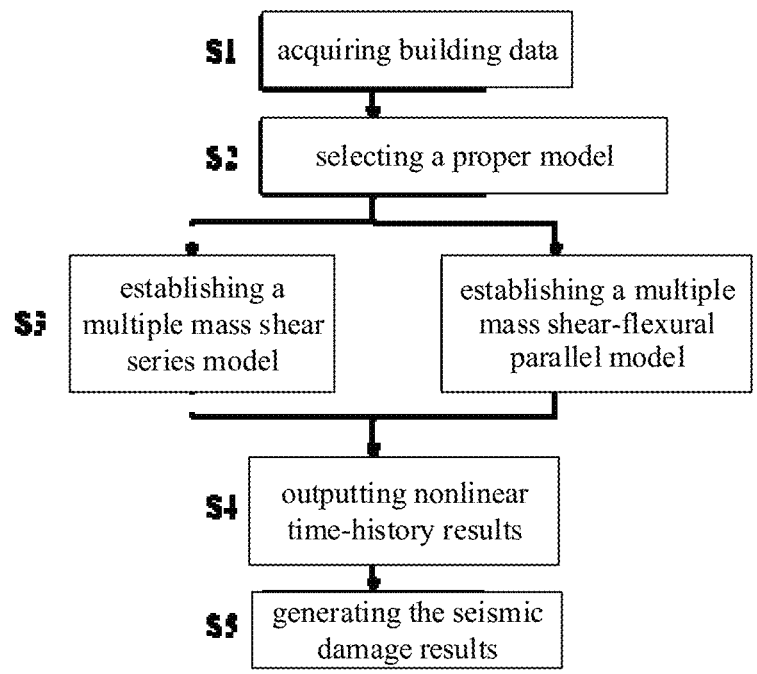
FIG. 2 is a flow chart of a method for city-scale nonlinear time-history analysis according to an embodiment of the present disclosure.

FIG. 1 is a flow chart of a method for city-scale nonlinear time-history analysis according to an embodiment of the present disclosure. Detailed explanation of the method for city-scale nonlinear time-history analysis provided in the present disclosure will be given in combination with FIG. 1 and FIG. 2.

As illustrated in FIG. 1, the method for city-scale nonlinear time-history analysis includes following actions.

At block S101, building data is acquired.

In an embodiment of the present disclosure, the building data includes one or more of a structural type, building height, a number of building stories, a construction year, a story area, and a building function.

It can be understood that, the building data may be acquired by relevant ways such as field investigation, consulting geographic information system (GIS) database, and the like. Further, detailed information of each building within an area under consideration. For some important buildings, more detailed information may be collected, such as design drawings, then fine finite element models are established, and relevant parameters may be obtained for subsequent parameter determination, such that the simulation result may be more accurate.

At block S102, a model type corresponding to the building data is obtained based on the building data.

In an embodiment of the present disclosure, the model type includes a multiple mass shear series model and a multiple mass shear-flexural parallel model.

In an embodiment of the present disclosure, based on the building function, the building height, and the structural type, a multiple mass shear series model is established for an unreinforced masonry structure, a reinforced masonry structure, a frame structure, and a structure with stories less than a given value, and a multiple mass shear-flexural parallel model is established for a shear wall structure, an frame-shear wall structure, and a structure with stories equal to or more than the given value.

In detail, the multiple mass shear series model may be selected for the unreinforced masonry structure, the reinforced masonry structure, the frame structure, and a structure with stories less than 10 based on the building function, the building height, and the structural type, because the multiple mass shear series model may accurately determine shear deformation mode of such types of buildings under earthquake. The multiple mass shear-flexural parallel model is established for the shear wall structure, the frame-shear wall structure, and the structure with stories equal to or more than 10, because the multiple mass shear-flexural parallel model may accurately determine flexure-shear coupling deformation mode of such types of buildings under earthquake.

At block S103, the multiple mass shear series model or the multiple mass shear-flexural parallel model corresponding to the building data is built based on the model type.

Figure 3:
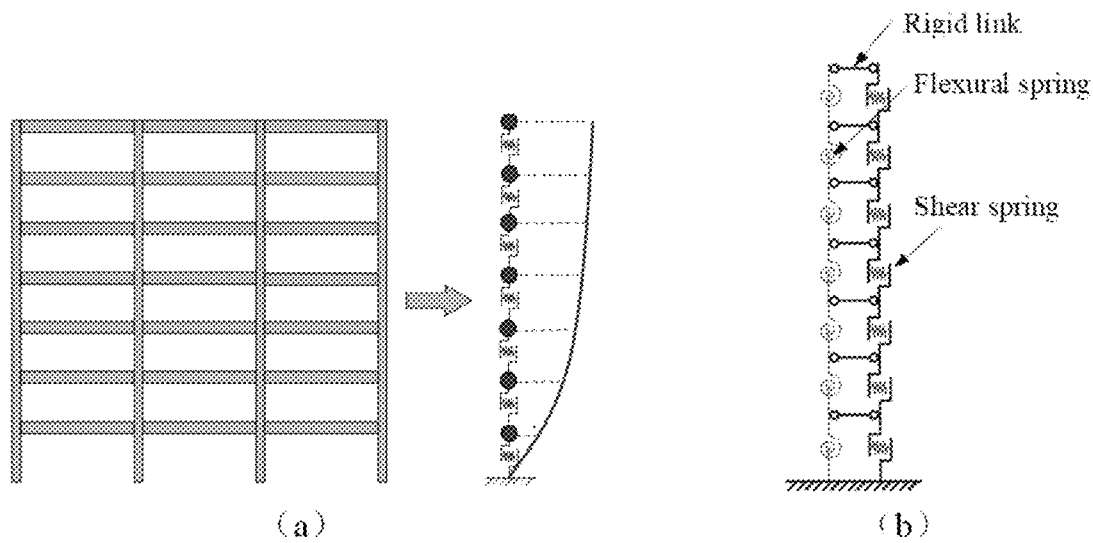
FIG. 3 is a schematic diagram illustrating a multiple mass shear series model and a multiple mass shear-flexural parallel model according to an embodiment of the present disclosure.

In an embodiment of the present disclosure, there are a large number of low-rise buildings in a city. Most of the low-rise buildings have obvious structural types and regular shapes, and usually shows an obvious shear deformation mode. Therefore, each of the building may be simplified as a multiple mass shear series model illustrated in FIG. 3(a).

Figure 4:
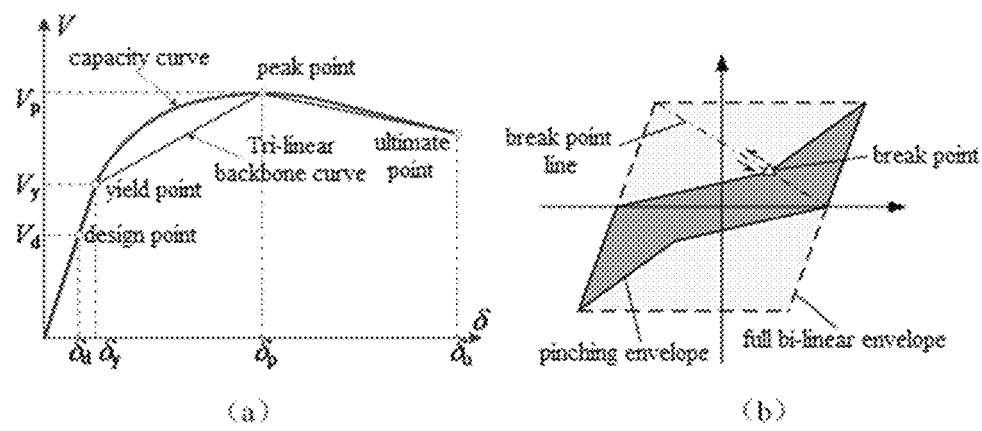
FIG. 4 is a schematic diagram illustrating a trilinear backbone curve in a model and a single-parameter hysteretic model according to an embodiment of the present disclosure.

In the multiple mass shear series model illustrated in FIG. 3(a), it is assumed that mass of each story of the structure is concentrated on the story, each story is considered to be rigid, and rotational displacement of the story is ignored. Therefore, each story of the building is simplified as a mass point, and the mass points of different stories are connected via a shear spring. A force-displacement relationship of the shear spring between stories is illustrated in FIG. 4. A backbone curve is a trilinear backbone curve, as illustrated in FIG. 4(a). An inter-story hysteretic model adopts a single parameter hysteretic model illustrated in FIG. 4(b).

Lateral global bending deformation of tall buildings cannot be ignored. Therefore, each building may be simplified as a multiple mass shear-flexural parallel model illustrated in FIG. 3(b). The trilinear backbone curve is adopted in the multiple mass shear-flexural parallel model, thus both bending deformation and shear deformation of the tall buildings can be taken into consideration.

With the embodiments of the present disclosure, different parameter determination methods are adopted for above two models and structures with different structural types, and the parameter determination methods are determined based on building the seismic design codes, much experimental data and numerical analysis. Therefore, regardless of the structural type, the respective parameters in the backbone curve and the hysteretic model in FIG. 3 may be determined by knowing macro information such as the structural type, the building height, the number of stories, the construction year, the story area, and the building function of the building, which is simple and convenient. Therefore, it's suitable for modeling large-scale regional buildings.

Detail description of a method for determining parameters for respective structural types in embodiments of the present disclosure will be given in the following.

Figure 5:
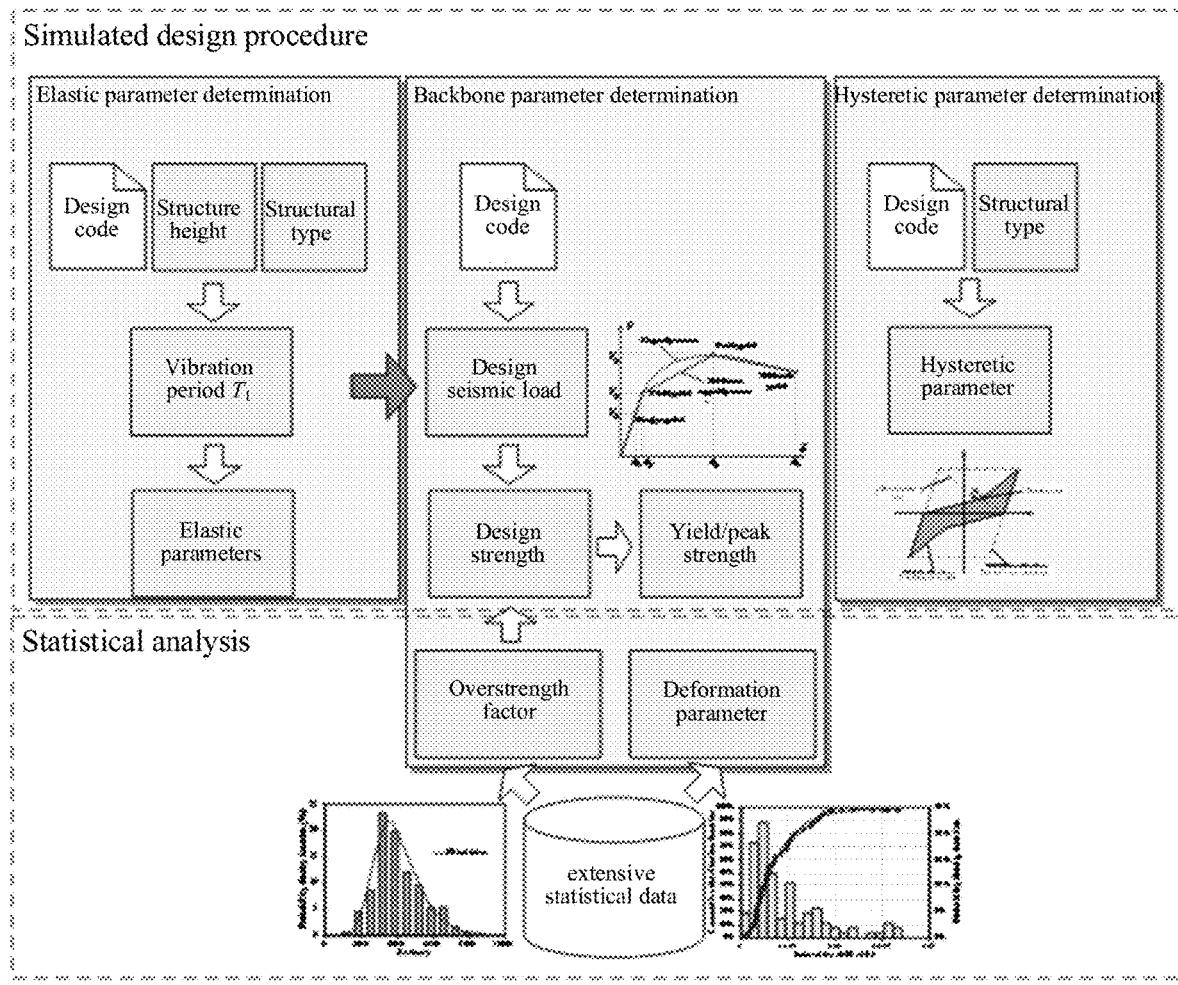
FIG. 5 is a flow chart of a parameter determination method for a frame structure according to an embodiment of the present disclosure.

Firstly, a process of determining parameters for the frame structure is performed. The process of determining parameters for the frame structure is as illustrated in FIG. 5, including following actions.

(1) Determination of the Elastic Parameters

The elastic parameters include the stiffness and mass of each story.

In an embodiment of the present disclosure, the mass m of each story can be obtained by multiplying mass per unit story area by the story area, the shear stiffness between stories can be obtained based on the mass of each story and a first vibration period $T_1$ by equation (1). A stiffness matrix and a mass matrix of the structure can be obtained after the m and $k_0$ are obtained.

$$k_0 = m\omega_1^2 \left( \frac{[\Phi_1]^T[I][\Phi_1]}{[\Phi_1]^T[A][\Phi_1]} \right) = \frac{4\pi^2 m}{T_1^2} \left( \frac{[\Phi_1]^T[I][\Phi_1]}{[\Phi_1]^T[A][\Phi_1]} \right), \quad (1)$$

where, $[\Phi_1]$ is a first-mode vector, [A] is a coefficient matrix of the stiffness matrix [K], [I] is a coefficient matrix of the mass matrix [M], the first vibration period $T_1$ can be obtained based on an equation recommended in the Chinese code (GB50009-2012). For example, the first vibration period $T_1$ may be obtained based on equation (2). For a structure with a large difference in long and short axis directions of the structure plane, equation (3) is recommended to calculate the first vibration period.

$$T_1 = (0.05 \sim 0.1)n, \quad (2)$$

$$T_1 = 0.25 + 0.00053 \, H^2 / \sqrt[3]{B}, \quad (3)$$

where, n is the number of building stories of the structure, H is the total height of the building, and B is the width of the building.

(2) Determination of the Backbone Curve Parameters

Figure 6:
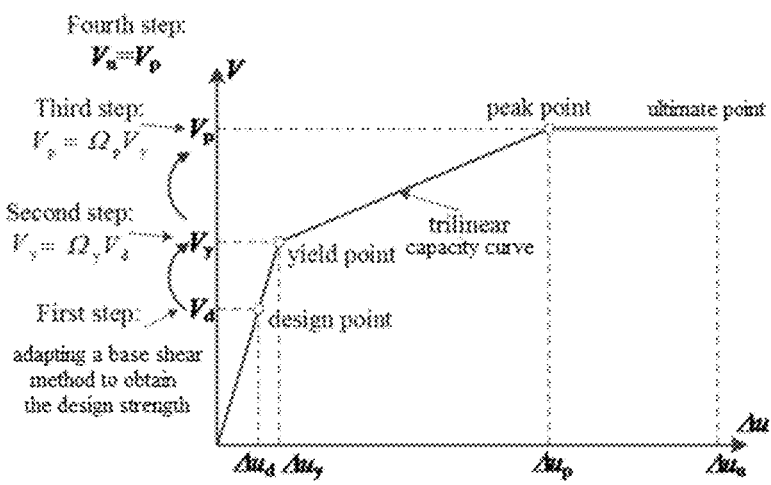
FIG. 6 is a flow chart of a method of determining strength parameters of a backbone curve in a frame structure according to an embodiment of the present disclosure.
Figure 7:
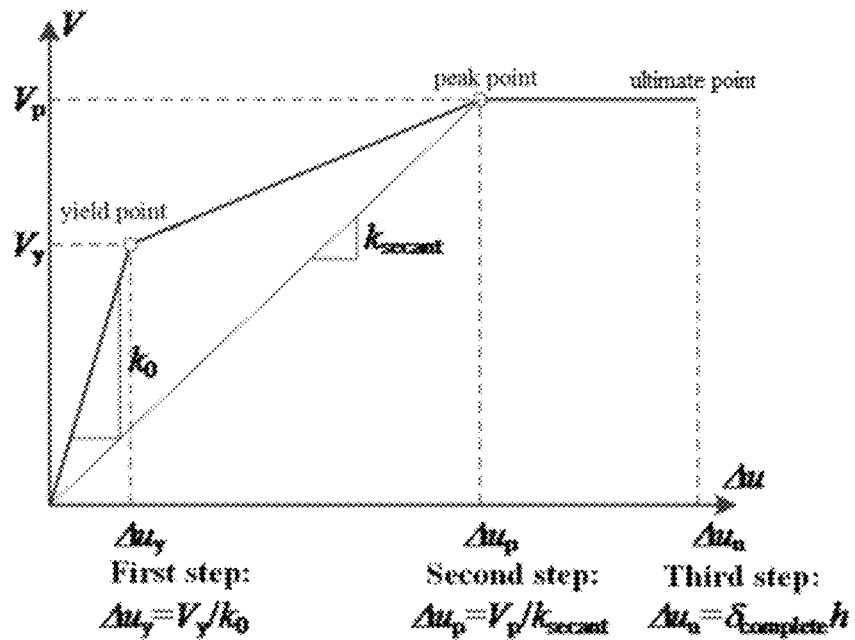
FIG. 7 is a flow chart of a method of determining deformation parameters of a backbone curve in a frame structure according to an embodiment of the present disclosure.

Backbone curve parameters include a strength parameter and a deformation parameter. The process for the strength parameter determination is illustrated in FIG. 6, and the process for the deformation parameter determination is illustrated in FIG. 7.

(a) The strength parameter includes the design strength, the yield strength, the peak strength, and the ultimate strength.

The frame structures are subject to district aseismic design. Therefore, the design strength $V_{d,i}$ of each story may be obtained based on the method for calculating a design strength in the Load code for the design of building structures (GB50009-2012). In the method, the base shear method is adapted to calculate the design strength of each story of the structure.

In an embodiment of the present disclosure, the yield strength $V_{y,i}$ and the peak strength $V_{p,i}$ may be obtained based on the equations (4) and (5) respectively.

$$V_{y,i} = \Omega_y V_{d,i}, \tag{4}$$

$$V_{p,i} = \Omega_p V_{y,i}, \tag{5}$$

where, $\Omega_y$ is a yield overstrength factor of frame structures. It is recommended that $\Omega_y$=1.1 in the model. $\Omega_p$ is a peak overstrength factor of the frame structures, and can be calculated based on equations (6), (7) and (8).

$$\Omega_p = K_1 K_2, \tag{6}$$

$$K_1 = 0.1519 DI^2 - 2.8238 DI + 14.9082, \tag{7}$$

$$K_2 = 1 - (0.0099n - 0.0197), \tag{8}$$

where, DI is the design intensity (ranging from 6 to 9), and n is the number of stories.

It can be understood that, the ultimate strength is equal to the peak strength because the frame structures usually exhibit a relatively good level of ductility.

(b) The deformation parameter includes the yield deformation, the peak deformation and the ultimate deformation. In an embodiment of the present disclosure, the yield deformation, the peak deformation and the ultimate deformation can be determined based on equations (9), (10), and (11) respectively.

$$\Delta u_{y,i} = V_{y,i}/k_0, \tag{9}$$

$$\Delta u_{p,i} = V_{p,i}/k_{secant}, \tag{10}$$

$$\Delta u_{u,i} = \delta_{complete} h \tag{11}$$

$$k_{secant} = \eta k_0 \tag{12}$$

where, $k_0$ is an initial inter-story stiffness of the structure, an inter-story shear secant stiffness $k_{secant}$ illustrated in FIG. 7 may be obtained based on equation (12), $\eta$ is a stiffness reduction factor when the peak strength of the structure is reached, $\delta_{complete}$ is an inter-story drift ratio of the "complete damage" state, and h is a story height of the structure.

(3) Determination of the Hysteretic Parameters

In an embodiment of the present disclosure, a hysteretic energy dissipation parameter $\tau$ can be calculated based on equation (13).

$$\tau = \frac{A_p}{A_b}, \tag{13}$$

where $A_p$ and $A_b$ are, respectively, the areas enclosed by the pinching envelope and that under the full bilinear envelope.

In an embodiment of the present disclosure, parameters for the masonry structure will be determined further.

In an embodiment of the present disclosure, the masonry structure is divided into an unreinforced masonry structure and a reinforced masonry structure. The method for determining elastic parameters and hysteretic parameters of the two masonry structures are similar with that of the frame structures. The method for a backbone curve parameter determination of the two masonry structures is different from that of the frame structures. The process of determining parameters for the masonry structure may include following actions.

(1) Determination of the Elastic Parameters

In an embodiment of the present disclosure, mass m of each story can be obtained by multiplying mass per unit story area by the story area. Shear stiffness between stories can be obtained based on the mass of each story and a first vibration period $T_1$ by using above equation (1). A stiffness matrix and a mass matrix of the structure may be obtained after the m and $k_0$ are obtained. The first vibration periods of the unreinforced masonry structure and the reinforced masonry structure can be determined based on equations (14) and (15) respectively. For a structure with a large difference in long and short axis directions of the structure plane, equations (16) and (17) may be recommended to use to calculate the first vibration periods.

$$T_1 = 0.064 + 0.053n, \text{ for the unreinforced masonry structure}, \tag{14}$$

$$T_1 = 0.221 + 0.025n, \text{ for the reinforced masonry structure}, \tag{15}$$

$$T_1 = 0.16441 + 0.00182 H^2/\sqrt{B}, \text{ for the unreinforced masonry structure}, \tag{16}$$

$$T_1 = 0.19486 + 0.00175 H^2, \text{ for the reinforced masonry structure}. \tag{17}$$

Figure 8:
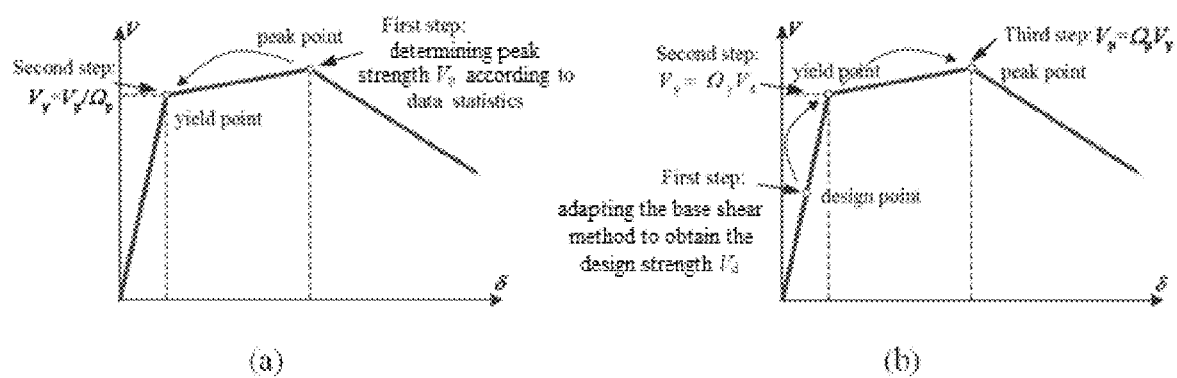
FIG. 8 is a flow chart of a method of determining strength parameters of a backbone curve in a masonry structure according to an embodiment of the present disclosure.

(2) Determination of the Backbone Curve Parameters (a) The method for determining strength parameters of the unreinforced masonry structure and reinforced masonry structure is illustrated in FIG. 8. The strength parameters of the masonry structure includes a yield strength, a peak strength, and an ultimate strength.

Figure 9:
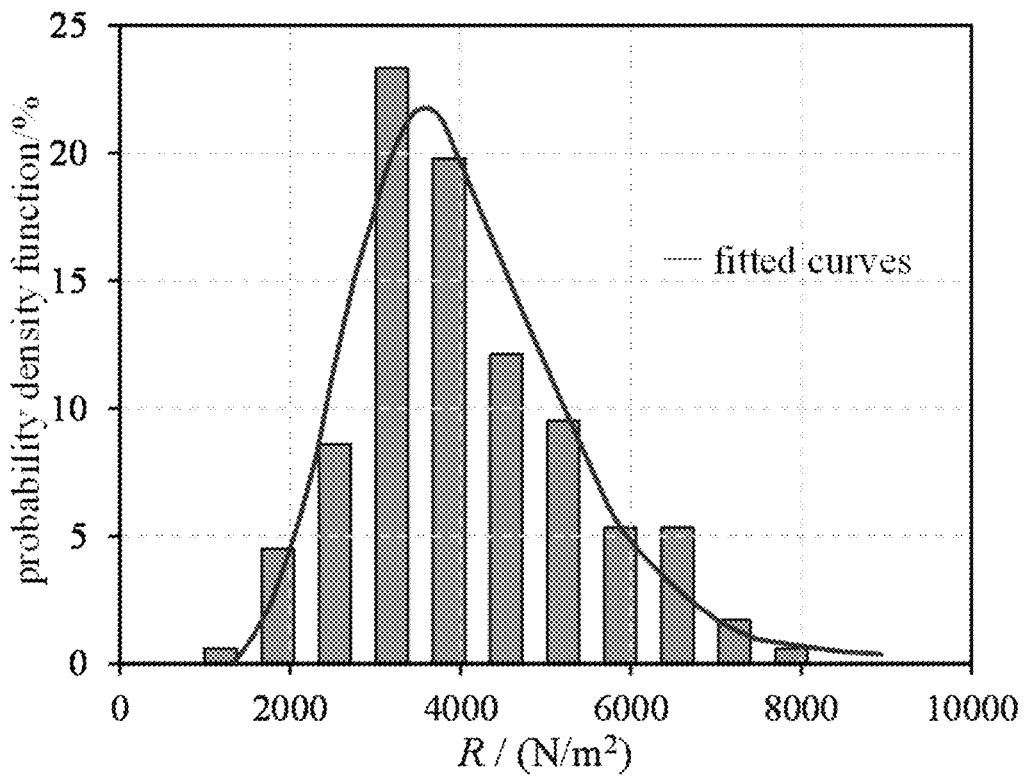
FIG. 9 is a schematic diagram illustrating probability distribution of peak strength of a backbone curve of an unreinforced masonry structure according to an embodiment of the present disclosure.

In an embodiment of the present disclosure, for the unreinforced masonry structure, the peak strength $V_{p,i}$ of each story of the unreinforced masonry structure can be calculated based on equation (18).

$$V_{p,i} = R A_i, \tag{18}$$

where, R is the peak strength per unit area, the value of R can be determined based on FIG. 9, $A_i$ is area of the $i^{th}$ story of the structure. After the peak strength of each story is obtained, the yield strength $V_{y,i}$ of each story of the unreinforced masonry structure can be calculated based on the peak overstrength factor $\Omega_p$ of the unreinforced masonry structure based on equation (19). In an embodiment of the present disclosure, the median value of $\Omega_p$ may be determined as 1.40 based on statistics.

$$V_{y,i} = V_{p,i}/\Omega_p, \tag{19}$$

For the reinforced masonry structure, the design strength $V_{d,i}$ of each story of the reinforced masonry structure is firstly obtained based on a base shear method (GB 50011-2010). And then, the yield strength $V_{y,i}$ and the peak strength $V_{p,i}$ of each story of the structure are calculated based on equations (20) and (21) respectively.

$$V_{y,i} = \Omega_y V_{d,i}, \qquad (20)$$

$$V_{p,i} = \Omega_p V_{y,i}, \qquad (21)$$

Where $\Omega_y$ is the yield overstrength factor of the reinforced masonry structure, which is the ratio between the yield strength and the design strength, and $\Omega_p$ is the peak overstrength factor reinforced masonry structure, which is the ratio between the peak strength and the yield strength. In an embodiment of the present disclosure, the median value of $\Omega_y$ may be determined as 2.33 and the median value of $\Omega_p$ may be determined as 1.41 based on statistics.

In this embodiment, for the masonry structure, a value of the ultimate strength may be 85% of the peak strength.

Figure 10:
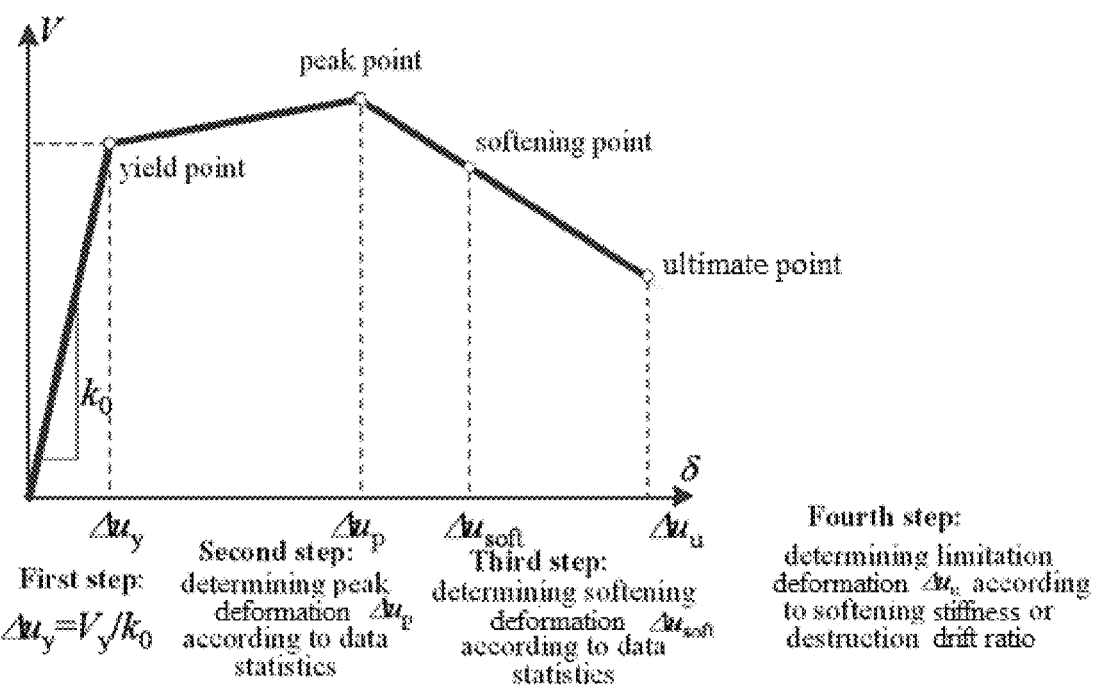
FIG. 10 is a flow chart of a method of determining deformation parameters of a backbone curve in a masonry structure according to an embodiment of the present disclosure.

(b) Deformation parameters of the unreinforced masonry structure and the reinforced masonry structure includes the yield point, the peak point, the softening point and the ultimate point in the backbone curve, which can be determined respectively based on the method illustrated in FIG. 10.

Similar to the frame structures, the masonry structure is assumed to behave linear until the yield point. Therefore, a yield deformation (the deformation of the yield point) $\Delta u_{y,i}$ of the unreinforced masonry structure and the reinforced masonry structure can be determined based on equation (22). The peak drift ratio $\delta_p$ can be determined based on equation (23), where h is height of single story. In an embodiment of the present disclosure, a median value of $\delta_p$ of the unreinforced masonry structure is determined to be 0.00268, and a median value of $\delta_p$ of the reinforced masonry structure is determined to be 0.00317. The drift ratio $\delta_{soft}$ of the softening point can be determined based on equation (24), where h is height of single story. In an embodiment of the present disclosure, a median value of $\delta_{soft}$ of the unreinforced masonry structure is determined to be 0.00507, and a median value of $\delta_{soft}$ of the reinforced masonry structure is determined to be 0.00960.

$$\Delta u_{y,i} = V_{y,i}/k_0 \qquad (22)$$

$$\Delta u_{p,i} = \delta_p h \qquad (23)$$

$$\Delta u_{soft,i} = \delta_{soft} h, \qquad (24)$$

(3) Determination of the Hysteretic Parameters

In an embodiment of the present disclosure, a method for determining a hysteretic energy dissipation parameter $\tau$ for the masonry structure is the same as that for the frame structures, and may be calculated based on above equation (13). A process for determining the parameters of tall buildings may be as follows.

Figure 11:
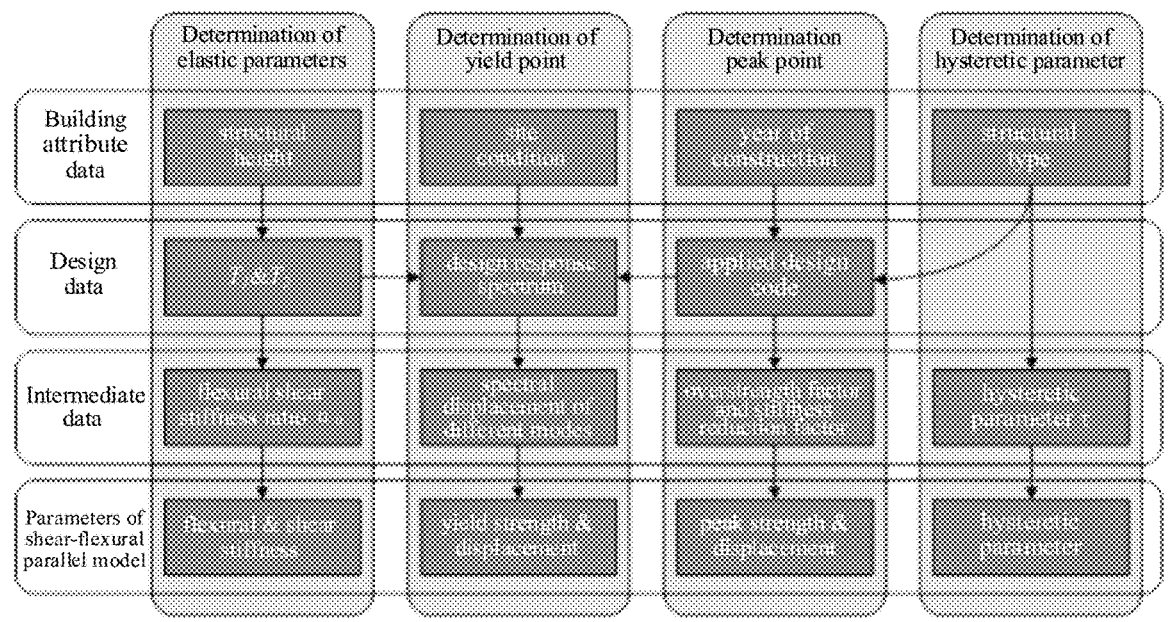
FIG. 11 is a flow chart of a method of determining model parameters of tall buildings according to an embodiment of the present disclosure.

A backbone curve of tall buildings may adopt the same form of backbone curve as the frame structures, and the process for determining the parameters are illustrated as FIG. 11, including followings.

The elastic parameters include a bending stiffness EI and a shear stiffness GA. These two parameters may be determined based on a first vibration period and the second vibration period of the structure. The first vibration period and the second vibration period of the structure can be determined based on modal analysis, actual detection or the empirical equation. Then the bending stiffness EI and the shear stiffness GA may be determined based on equations (25) to (28).

$$\frac{T_j}{T_1} = \frac{\gamma_1}{\gamma_j}\sqrt{\frac{\gamma_1^2 + \alpha_0^2}{\gamma_j^2 + \alpha_0^2}}, \qquad (25)$$

$$2 + \left[2 + \frac{\alpha_0^4}{\gamma_j^2(\gamma_j^2 + \alpha_0^2)}\right]\cos(\gamma_j)\cosh\left(\sqrt{\alpha_0^2 + \gamma_j^2}\right) + \qquad (26)$$

$$\left[\frac{\alpha_0^2}{\gamma_j\sqrt{\alpha_0^2 + \gamma_j^2}}\right]\sin(\gamma_j)\sinh\left(\sqrt{\alpha_0^2 + \gamma_j^2}\right) = 0,$$

$$\alpha_0 = H\sqrt{\frac{GA}{EI}}, \qquad (27)$$

$$\omega_1^2 = \frac{EI}{\rho H^4}\gamma_1^2(\gamma_1^2 + \alpha_0^2), \qquad (28)$$

where, $\alpha_0$ represents the flexural-shear stiffness ratio of the structure, $\omega_1$ is a first angular frequency of the building, $\gamma_j$ represents eigenvalue parameters related to $j^{th}$-mode of vibration of the structure.

(2) Determination of the Yield Parameters

Considering the contribution of high-order vibration modes to the response of tall structures, in this model, a mode-superposition response spectrum method is used to calculate the spectral displacement $D_j$ corresponding to each order of vibration mode of the structure under earthquake action. In an embodiment of the present disclosure, an inter-story displacement $\Delta u_{i,j}$ and a rotation angle $\Delta \theta_{i,j}$ of the structure may be obtained through equations (29), (30), (31), and (32).

$$u_{i,j} = \Gamma_j \phi_{i,j} D_j, \qquad (29)$$

$$\Delta u_{i,j} = u_{i,j}/u_{i-1,j}, \qquad (30)$$

$$\theta_{i,j} = \partial u_{i,j}/\partial z, \qquad (31)$$

$$\Delta \theta_{i,j} = \theta_{i,j}/\theta_{i-1,j} \qquad (32)$$

where, $\phi_{i,j}$ is a vibration-mode vector of a $j^{th}$-order vibration mode of the $i^{th}$ story of the structure, $\Gamma$ is a mode participation factor. In an embodiment of the present disclosure, a design shear force $V_{i,j}$ and a design bending moment $M_{i,j}$ of each story corresponding to each order vibration mode can be calculated based on equations (33) and (34).

$$V_{i,j} = \Delta u_{i,j} GA/h_i, \qquad (33)$$

$$M_{i,j} = \Delta \theta_{i,j} EI/h_i, \qquad (34)$$

In an embodiment of the present disclosure, respective orders of the earthquake action are combined according to a square root of the sum of the squares (SRSS) method based on equations (35) and (36), so that a design shear force of a shear spring and a design bending moment of a flexural spring of each story can be obtained. The equations (35) and (36) are as follows.

$$V_{a,i} = \sqrt{\Sigma V_{i,j}^2}, \qquad (35)$$

$$M_{a,i} = \sqrt{\Sigma M_{i,j}^2}, \qquad (36)$$

Finally, the coupling model adjusts the shear force and bending moment based on *Building Aseismic Design Regulations* (GB 50011-2010) and *Technical Specification for*

Concrete Structures of Tall Building (JGJ 3-2010), to meet the requirements of a minimum shear force and a minimum bending moment of a bottom reinforced area. In an embodiment of the present disclosure, a yield shear strength and a yield bending strength can be obtained based on equations (37) and (38).

$$V_{y,i}=V_{d,i}\Omega_y, \quad (37)$$

$$M_{y,i}=M_{d,i}\Omega_y. \quad (38)$$

According to statistical regression, a relationship between a yield overstrength factor $\Omega_y$ and a seismic precautionary intensity DI of the structure, and a relationship between a peak overstrength factor $\Omega_p$ and the seismic precautionary intensity DI of the structure are as equations (39) and (40).

$$\Omega_y=-0.1565DI+2.7499, \quad (39)$$

$$\Omega_p=(-0.5589DI+7.6346)/(-0.1565DI+2.7499) \quad (40)$$

In an embodiment of the present disclosure, an inter-story yield displacement and an inter-story yield drift ratio can be obtained based on equations (41) and (42).

$$\Delta u_{y,i} = \frac{V_{y,i}h_i}{GA}, \quad (41)$$

$$\Delta\theta_{y,i} = \frac{M_{y,i}h_i}{EI}, \quad (42)$$

(3) Peak Parameters Calibration

In an embodiment of the present disclosure, a peak shear strength $V_{p,i}$ of the shear spring and a peak bending strength $M_{p,i}$ of the flexural spring for each story can be determined based on equations (43) and (44).

$$V_{p,i}=\Omega_p V_{y,i}, \quad (43)$$

$$M_{p,i}=\Omega_p M_{y,i}, \quad (44)$$

where, $\Omega_p$ is the peak overstrength factor, and may be determined based on equation (40).

Since the stiffness of the concrete structure may decrease after cracking, the peak displacement of the structure may be calculated based on a reduced bending stiffness $E_r I$ and an reduced shear stiffness $G_r A$, using equations (45) and (46)

$$E_r I=\eta EI, \quad (45)$$

$$G_r A=\eta GA. \quad (46)$$

The stiffness reduction factor η can be determined according to Provision 10.10.4.1 of ACI 318-08. Therefore, a peak inter-story displacement $\Delta u_{p,i}$ and a peak inter-story drift ratio 44, of the structure can be determined according to equations (47) and (48).

$$\Delta u_{p,i} = \frac{V_{p,i}h_i}{G_r A} \quad (47)$$

$$\Delta\theta_{p,i} = \frac{M_{p,i}h_i}{E_r I}. \quad (48)$$

At block S104, nonlinear history analysis is performed according to time history data of ground motion acceleration from each building through the multiple mass shear series model or the multiple mass shear-flexural parallel model, to obtain a nonlinear history analysis result.

In detail, the acceleration time history data is input for each building. The nonlinear history analysis of the structure is performed by using a motion equation (i.e., equation (49)) in the structural dynamics.

$$M\ddot{u}+C\dot{u}+F=-M\ddot{u}_g, \quad (49)$$

where, M is a model mass matrix, C is a damping matrix. For example, Rayleigh damping is used in embodiments of the present disclosure. F is a structural internal force. ü, u̇ and u are the acceleration vector, velocity vector and displacement vector corresponding to each degree of freedom of the structure, respectively. $u_g$ is the time history of ground motion.

At block S105, the seismic damage state and an analysis result of each story of each building are obtained based on the nonlinear history analysis result.

The seismic damage state of each story of each building is evaluated to obtain corresponding important data such as the displacement, the acceleration. Based on above steps, the present disclosure provides a program, so as to perform corresponding calculation more quickly and smoothly.

Figure 12:
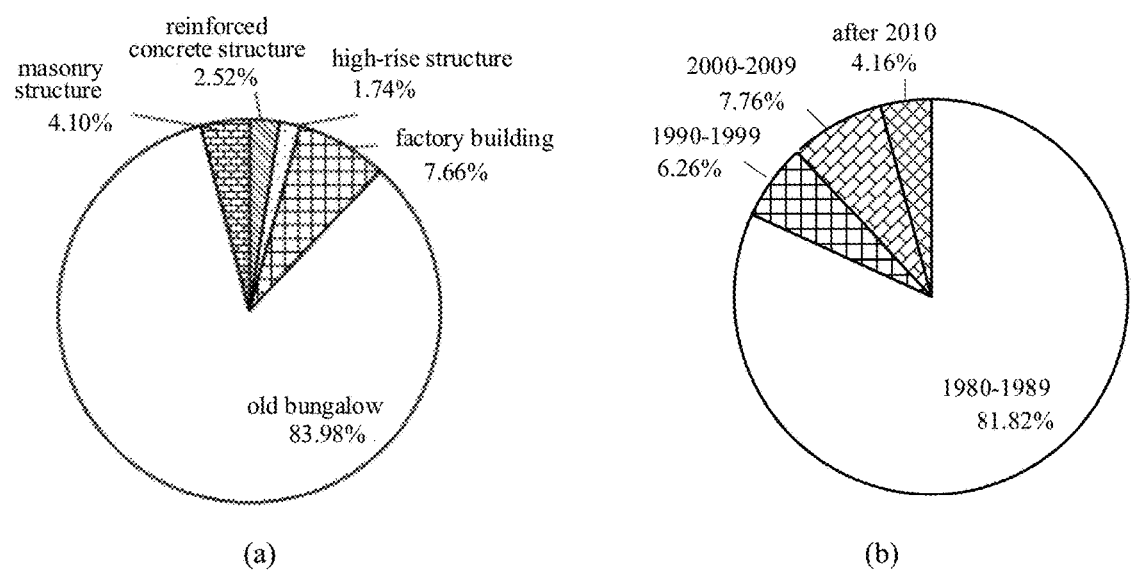
FIG. 12 is a schematic diagram illustrating composition of construction years and structural types in Tangshan city according to an embodiment of the present disclosure.

Taking Tangshan urban buildings as an example, in an embodiment of the present disclosure, building attribute information of 230,683 buildings in Tangshan urban area is obtained through the Tangshan Urban Planning Department. The building attribute information includes the structural type, the height, the number of stories, the construction year, the story area, etc., with detailed data. Simulation may be performed on each building with these data by using the analysis model in the present disclosure. The composition of the construction years and the building types is shown in FIG. 12.

Figure 13:
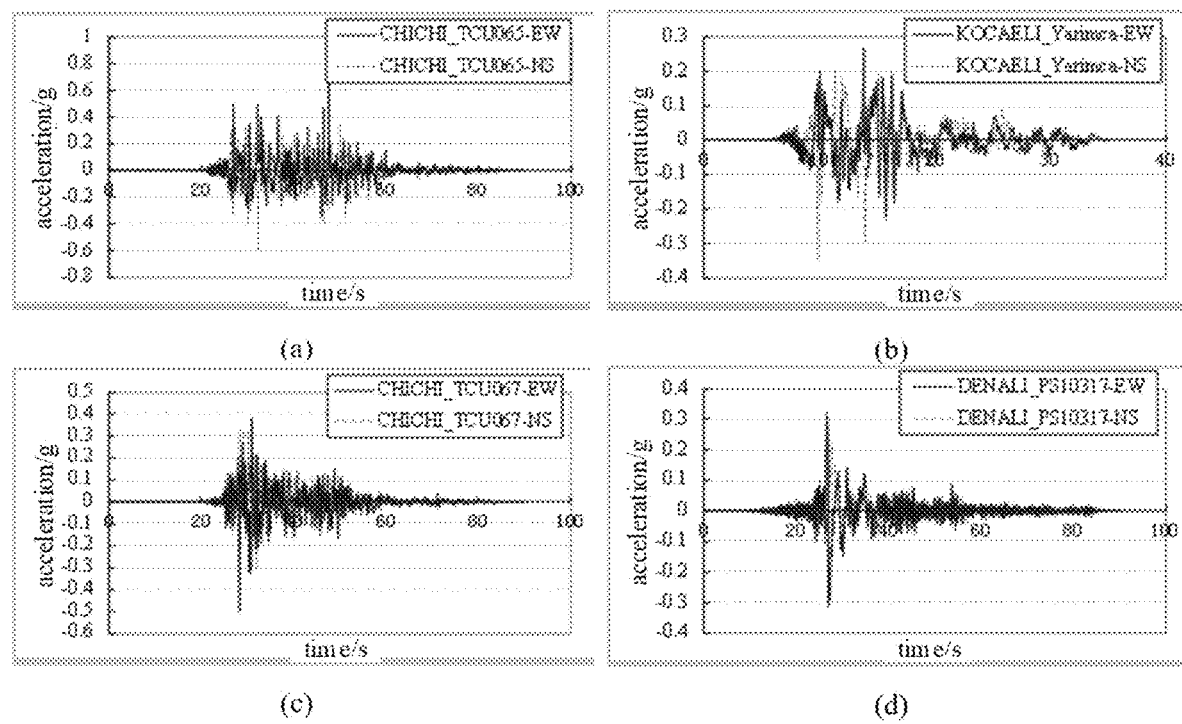
FIG. 13 is a schematic diagram illustrating time-history curves of inputted ground motion according to an embodiment of the present disclosure.

Since there were few strong earthquake observation stations in China when the Tangshan earthquake occurred, there was a lack of relevant seismic records of good quality. Therefore, in this example, four representative near-field earthquake (i.e., a source distance is less than 10 km) records are selected from the US Federal Emergency Management Agency P695 report. Their magnitude is similar to that of the Tangshan earthquake, and the acceleration time-history curves of them are shown in FIG. 13. The magnitude of the earthquake in Chichi, Taiwan, China is 7.6, and the magnitude of the earthquake in Kacaeli, Turkey is 7.5, and the magnitude of the earthquake in Denali, America is 7.9.

Figure 14:
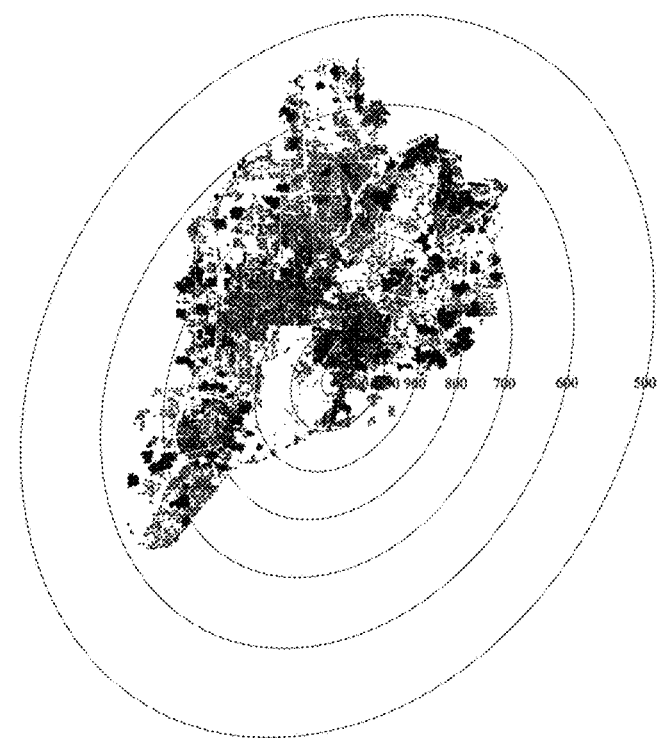
FIG. 14 is a schematic diagram illustrating an attenuation relationship of PGA (Peak Ground Acceleration) of inputted ground motion according to an embodiment of the present disclosure.

Due to a wide range of a target area, a single ground motion input is quite different from the actual situation, so attenuation of the ground motion needs to be considered. In this simulation, attenuation is performed along direction of the long and short axes of an ellipse, and an epicenter Peak Ground Acceleration (PGA)=1160 cm/s², as shown in FIG. 14. According to the above attenuation rule of PGA, a PGA value of a building in each position may be obtained, and amplitude modulation may be performed on the ground motion, and the amplitude modulated ground motion may be taken as the input of the ground motion.

Based on the basic information and ground motion information of buildings in the above areas, seismic hazard simulation is performed on Tangshan city with the multiple mass shear series model and the multiple mass shear-flexural parallel model, provided in the present disclosure. Proportion statistics of different damage levels according to building fortification types are shown in Table 1, in which, the proportion of intact and minor damage is 0, so it is omitted. It is worth noting that, total calculation time for the four ground motion records of the 230,683 buildings in the above example only takes about 5 hours. If parallel technology is introduced, this time will be further shortened.

TABLE 1

| Ground motion | Structure types of fortification | Moderate damage | Extensive damage | Destroyed |
|---|---|---|---|---|
| CHICHI_TCU065 | Structure with fortification | 10.43% | 86.63% | 2.94% |
| | Structure without fortification | 0.00% | 5.30% | 94.70% |
| | Total | 8.41% | 70.89% | 20.69% |
| KOCAELI_Yarimca | Structure with fortification | 6.28% | 85.80% | 7.92% |
| | Structure without fortification | 0.00% | 1.28% | 98.72% |
| | Total | 5.07% | 69.45% | 25.48% |
| CHICHI_TCU067 | Structure with fortification | 5.11% | 74.83% | 20.05% |
| | Structure without fortification | 0.00% | 2.66% | 97.34% |
| | Total | 4.12% | 60.87% | 35.01% |
| DENALI_PS10317 | Structure with fortification | 0.00% | 56.61% | 43.39% |
| | Structure without fortification | 0.00% | 0.82% | 99.18% |
| | Total | 0.00% | 45.81% | 54.19% |
| Mean value | Structure with fortification | 5.46% | 75.97% | 18.58% |
| | Structure without fortification | 0.00% | 2.51% | 97.49% |
| | Total | 4.40% | 61.76% | 33.84% |

In conclusion, through the above examples, it can be summarized that, with the method for city-scale nonlinear time-history analysis provided in the embodiments of the present disclosure, important data such as the seismic damage state, the displacement, the acceleration, etc., for each story of each building is obtained. In addition, the multiple mass shear series model and the multiple mass shear-flexural parallel model according to the embodiments of the present disclosure can accurately reflect seismic hazard characteristics of buildings of different heights, having extremely high calculation efficiency and simple modeling methods, and can be used in seismic hazard prediction and real-time seismic hazard analysis after earthquake within typical urban earthquake scenarios, so as to provide support for post-earthquake rescue work and related decision-making.

With the method for city-scale nonlinear time-history analysis according to embodiments of the present disclosure, the multiple mass shear series model or the multiple mass shear-flexural parallel model is established based on the building data, the nonlinear history analysis is performed according to the time history data of ground motion acceleration, and the seismic damage state of each story of each building is analyzed according to the analysis result, thus seismic hazard characteristics of buildings with different heights may be accurately reflected and closer to effect of actual seismic hazard, calculation efficiency is high, and modeling method is simple. The method may be used for accurate and real-time seismic hazard prediction and seismic hazard analysis under typical urban earthquake scenarios.

Then, a device for city-scale nonlinear time-history analysis according to an embodiment of the present disclosure will be described with reference to the drawings.

Figure 15:
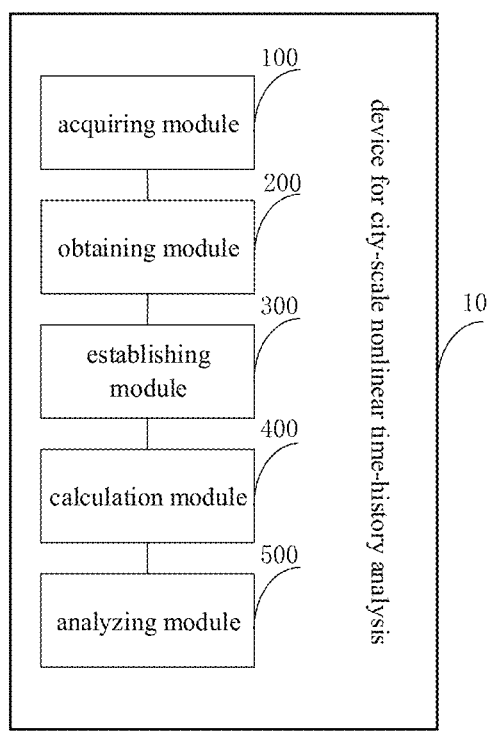
FIG. 15 is a block diagram illustrating a device for city-scale nonlinear time history analysis.

FIG. 15 is a block diagram illustrating a device for city-scale nonlinear time-history analysis.

As illustrated in FIG. 15, the device for city-scale nonlinear time-history analysis includes: an acquiring module 100, configured to acquire building data; an obtaining module 200, connected to the acquiring module, and configured to obtain a model corresponding to the building data according to the building data; an establishing module 300, connected to the obtaining module, and configured to establish a multiple mass shear series model or a multiple mass shear-flexural parallel model corresponding to the building data according to the model corresponding to the building data; a calculation module 400, connected to the establishing module, and configured to perform nonlinear history analysis according to time history data of ground motion acceleration from each building through the multiple mass shear series model or the multiple mass shear-flexural parallel model, to obtain a nonlinear history analysis result; and an analyzing module 500, connected to the calculation module, configured to obtain a seismic damage state and an analysis result of each story of each building according to the nonlinear history analysis result.

It should be noted that, the foregoing descriptions in the embodiments of the method for city-scale nonlinear time-history analysis are also suitable for the device according to this embodiment, which is not elaborated herein.

Further, in an embodiment of the present disclosure, the establishing module 300 is configured to, according to the building function, the building height and the structural type, establish multiple mass shear series model for an unreinforced masonry structure, a reinforced masonry structure, a frame structure, and a structure with stories less than a given value, and establish the multiple mass shear-flexural parallel model for a shear wall structure, a frame-shear wall structure, and a structure with stories equal to or more than the given value.

Further, in an embodiment of the present disclosure, the calculation module 400 is configured to: obtain the time history data of ground motion acceleration from each building; and perform structure nonlinear history analysis according to the acceleration time history data through a motion equation in structural dynamics.

Further, in an embodiment of the present disclosure, the seismic damage state and the analysis result of each story of each building comprises a seismic damage state of each story of each building, a displacement history result of each story of each building, a velocity history result of each story of each building, an acceleration history result of each story of each building, a figure and animation of seismic response and damage states of the urban buildings.

With the device for city-scale nonlinear time-history analysis city-scale nonlinear time-history analysis according to embodiments of the present disclosure, the multiple mass shear series model or the multiple mass shear-flexural parallel model is established based on the building data, the nonlinear history analysis is performed according to the time history data of ground motion acceleration, and the seismic damage state of each story of each building is analyzed according to the analysis result, thus seismic hazard characteristics of buildings with different heights may be accurately reflected and closer to effect of actual seismic hazard, calculation efficiency is high, and modeling method is simple. The method may be used for accurate and real-time seismic hazard prediction and seismic hazard analysis under typical urban earthquake scenarios.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description, do not indicate or imply that the device or element referred to must have a particular orientation or be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, for example, two or three, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, without any contradiction, those skilled in the art can combine different embodiments or examples and the features of the different embodiments or examples described in this specification.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for city-scale nonlinear time-history analysis, comprising:

acquiring building data comprising one or more of a structural type, building height, a number of building stories, a construction year, a story area, and a building function;

according to the building function, the building height and the structural type, establishing a multiple mass shear series model for an unreinforced masonry structure, a reinforced masonry structure, a frame structure, and a structure with stories less than a given value, and establishing a multiple mass shear-flexural parallel model for a shear wall structure, a frame-shear wall structure, and a structure with stories equal to or more than the given value;

performing nonlinear history analysis according to time history data of ground motion acceleration from each building through the multiple mass shear series model or the multiple mass shear-flexural parallel model, to obtain a nonlinear history analysis result;

obtaining a seismic damage state and an analysis result of each story of each building according to the nonlinear history analysis result, wherein the seismic damage state and the analysis result of each story of each building comprises a seismic damage state of each story of each building, a displacement history result of each story of each building, a velocity history result of each story of each building, an acceleration history result of each story of each building, a figure and animation of seismic response and damage states of the urban buildings; and providing support for post-earthquake rescue work based on the seismic damage state and analysis result of each story of each building.

2. The method according to claim 1, wherein, the multiple mass shear series model is determined according to the structural type, the building height, the number of building stories, the construction year, the story area, and the building function, where a backbone curve of the multiple mass shear series model is a trilinear backbone curve, and an inter-story hysteretic behavior is determined based on a single-parameter hysteretic model;

the multiple mass shear-flexural parallel model is determined according to the structural type, the building height, the number of building stories, the construction year, the story area, and the building function, where the multiple mass shear-flexural parallel model consists of flexural springs, shear springs and rigid links to consider both the bending deflection and shear deformation of tall buildings.

3. The method according to claim 1, wherein performing the nonlinear history analysis according to time history data of ground motion acceleration from each building through the multiple mass shear series model or the multiple mass shear-flexural parallel model comprises:

obtaining the time history data of ground motion acceleration from each building; and performing structure nonlinear history analysis according to the time history acceleration data through a motion equation in structural dynamics.

4. An electronic device for city-scale nonlinear time-history analysis, comprising:
a processor; and
a memory configured to store with a program executed by the processor;
wherein the processor is configured to:
acquire building data comprising one or more of a structural type, building height, a number of building stories, a construction year, a story area, and a building function;
according to the building function, the building height and the structural type, establish a multiple mass shear series model for an unreinforced masonry structure, a reinforced masonry structure, a frame structure, and a structure with stories less than a given value, and establish a multiple mass shear-flexural parallel model for a shear wall structure, a frame-shear wall structure, and a structure with stories equal to or more than the given value;
perform nonlinear history analysis according to time history data of ground motion acceleration from each building through the multiple mass shear series model or the multiple mass shear-flexural parallel model, to obtain a nonlinear history analysis result;
obtain a seismic damage state and an analysis result of each story of each building according to the nonlinear history analysis result, wherein the seismic damage state and the analysis result of each story of each building comprises a seismic damage state of each story of each building, a displacement history result of each story of each building, a velocity history result of each story of each building, an acceleration history result of each story of each building, a figure and animation of seismic response and damage states of the urban buildings; and
provide support for post-earthquake rescue work based on the seismic damage state and analysis result of each story of each building.

5. The electronic device according to claim 4, wherein the processor is further configured to: obtain the time history data of ground motion acceleration from each building; and perform structure nonlinear history analysis according to the acceleration time history data through a motion equation in structural dynamics.

* * * * *